(12) United States Patent
Kaneko et al.

(10) Patent No.: US 7,962,004 B2
(45) Date of Patent: Jun. 14, 2011

(54) VIDEO REPRODUCING APPARATUS

(75) Inventors: Yuki Kaneko, Inagi (JP); Shinji Kuno, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 101 days.

(21) Appl. No.: 12/494,093

(22) Filed: Jun. 29, 2009

(65) Prior Publication Data

US 2010/0158481 A1   Jun. 24, 2010

(30) Foreign Application Priority Data

Dec. 23, 2008   (JP) ................. 2008-326680

(51) Int. Cl.
H04N 9/80 (2006.01)
H04N 5/765 (2006.01)
H04N 5/92 (2006.01)
(52) U.S. Cl. ......... 386/239; 386/200; 386/244; 386/248
(58) Field of Classification Search ............ 386/200, 386/239, 244, 248
See application file for complete search history.

(56) References Cited

U.S. PATENT DOCUMENTS

| | | | | |
|---|---|---|---|---|
| 5,621,469 | A * | 4/1997 | Monta et al. | 348/445 |
| 5,742,352 | A * | 4/1998 | Tsukagoshi | 348/468 |
| 6,130,722 | A * | 10/2000 | Bae et al. | 348/589 |
| 6,246,401 | B1 | 6/2001 | Setogawa et al. | |
| 6,266,478 | B1 | 7/2001 | Yoshio et al. | |
| 6,856,756 | B1 | 2/2005 | Mochizuki et al. | |
| 2004/0027539 | A1 * | 2/2004 | Plunkett | 352/90 |
| 2009/0010620 | A1 * | 1/2009 | Hatabu | 386/124 |
| 2009/0207305 | A1 * | 8/2009 | Fujita et al. | 348/468 |
| 2009/0249393 | A1 * | 10/2009 | Shelton et al. | 725/39 |
| 2010/0097522 | A1 * | 4/2010 | Aoyama | 348/468 |

FOREIGN PATENT DOCUMENTS

| | | |
|---|---|---|
| JP | H09-282848 A | 10/1997 |
| JP | H10-145722 A | 5/1998 |
| JP | H11-102573 A | 4/1999 |
| JP | H11-353790 A | 12/1999 |
| JP | 2001-078149 A | 3/2001 |
| JP | 2004-260711 | 9/2004 |

OTHER PUBLICATIONS

Explanation of Non-English Language Reference(s).
Notification of Reasons for Refusal mailed by Japan Patent Office on Sep. 15, 2009 in the corresponding Japanese patent application No. 2008-326680.
Notification of Reasons for Refusal mailed by Japan Patent Office on Dec. 8, 2009 in the corresponding Japanese patent application No. 2008-326680.

* cited by examiner

*Primary Examiner* — Thai Tran
*Assistant Examiner* — Hung Q Dang
(74) *Attorney, Agent, or Firm* — Knobbe, Martens Olson & Bear LLP

(57) ABSTRACT

According to the invention, a video reproducing apparatus includes: a reading module configured to read out video information and caption information, the video information including control information; a video processing module configured to generate a display image to be displayed on a screen, the display image having an image corresponding to the control information; a caption processing module configured to generate a subpicture based on the caption information, the subpicture including a caption image for a caption and a mask image for masking the image corresponding to the control information when the subpicture is superimposed on the display image; a video synthesizing module configured to generate an overlapped display image by superimposing the subpicture; and a video signal outputting module configured to output the overlapped display image to a control signal extracting apparatus that extracts a control signal from the masked image corresponding to the control information.

7 Claims, 7 Drawing Sheets

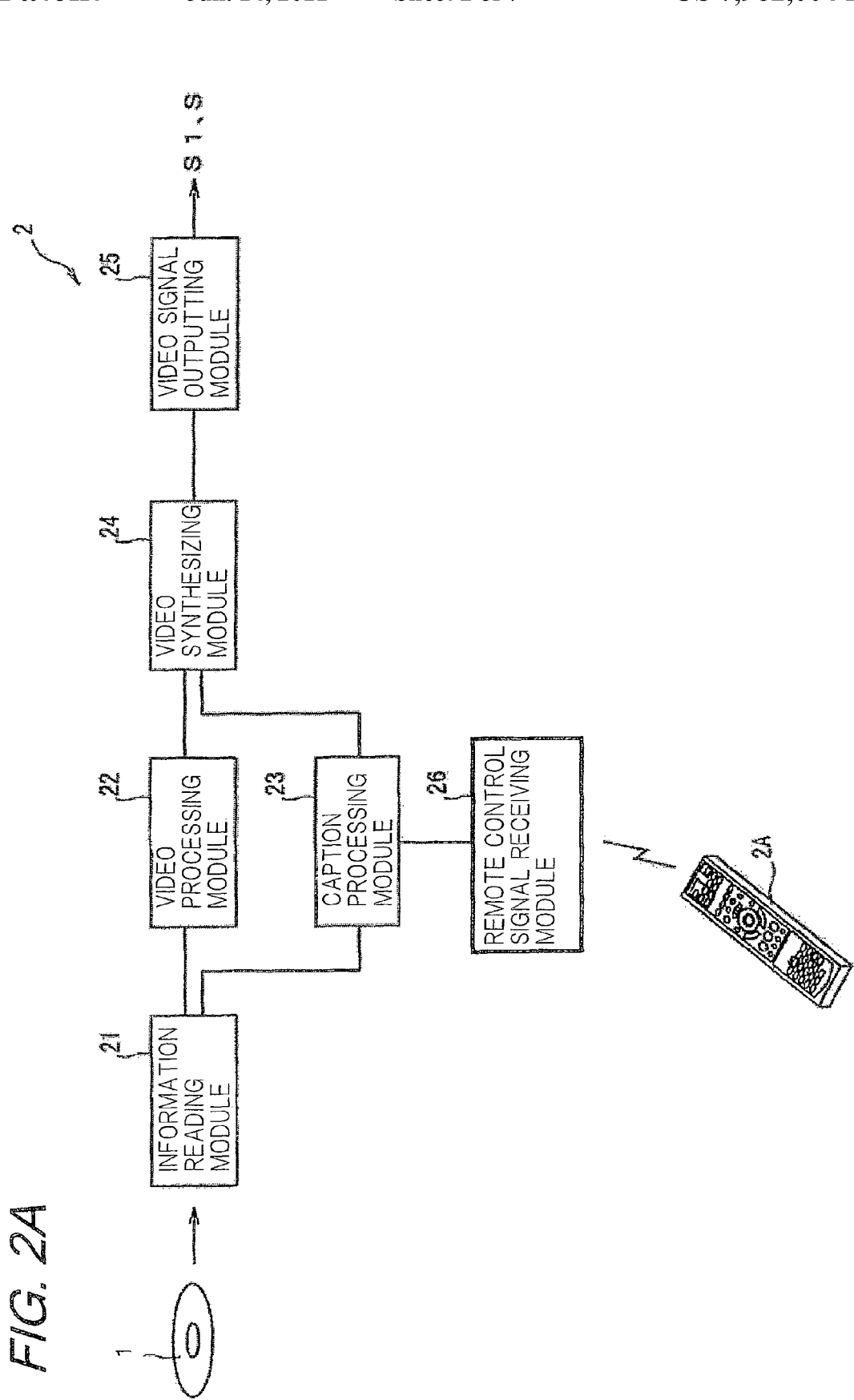

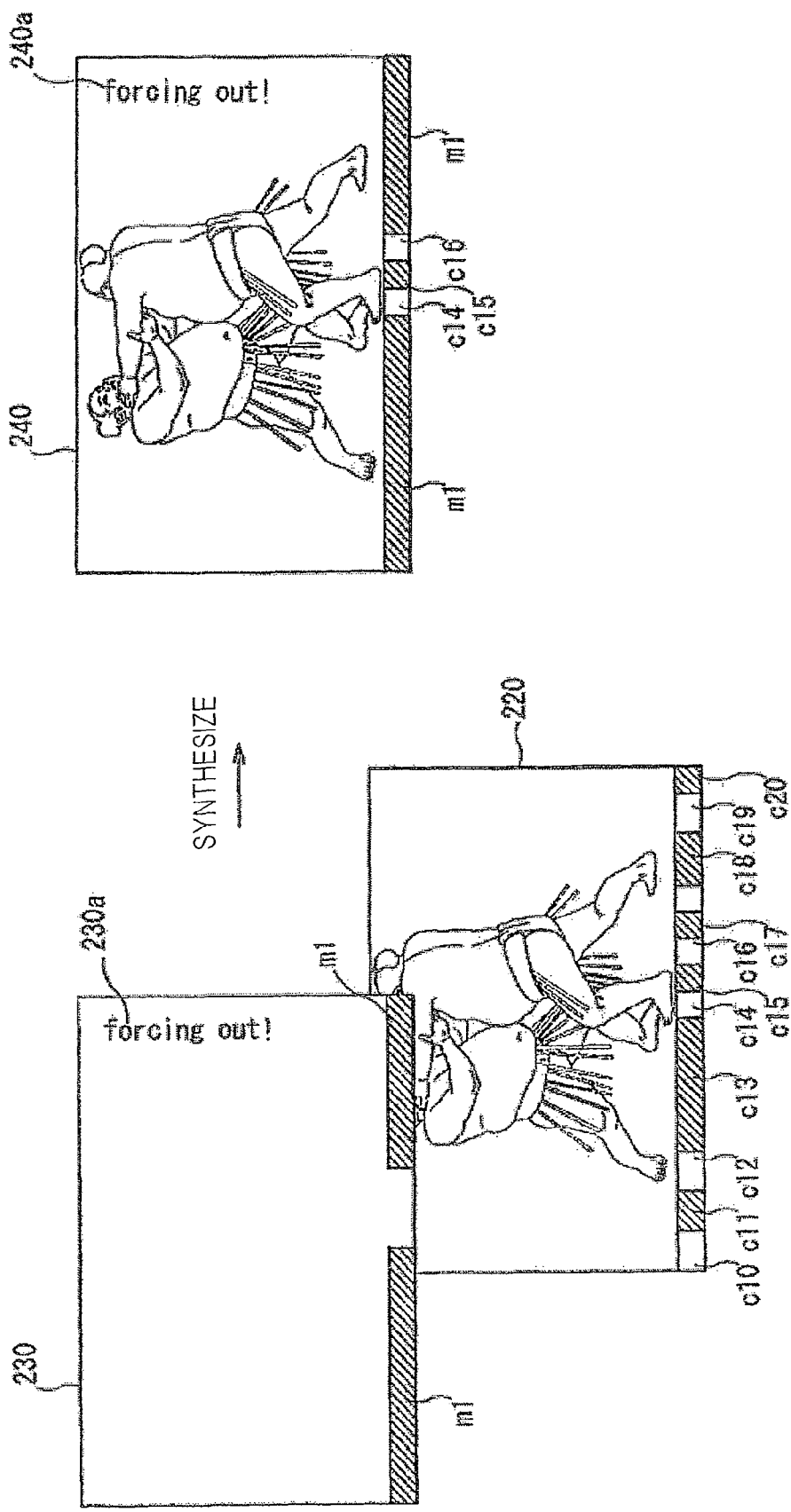

FIG. 4D      NO MASK

FIG. 5
CAPTION 1 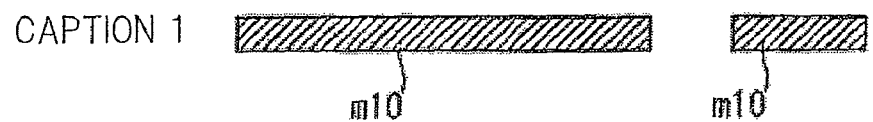
CAPTION 2 
CAPTION 3 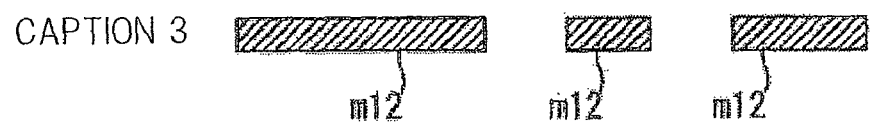
⋮
CAPTION 32 

VIDEO REPRODUCING APPARATUS

CROSS-REFERENCE TO RELATED APPLICATIONS

This application is based upon and claims the benefit of priority from Japanese Patent Application No. 2008-326680, filed Dec. 23, 2008, the entire contents of which are incorporated herein by reference.

BACKGROUND

1. Field

The present invention relates to a video reproducing apparatus.

2. Description of the Related Art

As the prior art, there is a video reproducing apparatus for changing a display configuration of a subpicture of a DVD (Digital Versatile Disc) based on setting of a user (for example, see JP-A-2001-78149).

The video reproducing apparatus includes a reading module for reading video information and subpicture information which are recorded on a DVD, a reproducing module for reproducing the video information and subpicture information thus read, a setting module for accepting setting of a display configuration of a subpicture based on an operating signal input by a user, and a control module for controlling a reproducing module to display the subpicture information based on the display configuration thus set, and the setting module can change a color, a size, a position and a scroll speed of the subpicture. Therefore, it is possible to display the subpicture in a desirable display configuration of the user.

According to the conventional video reproducing apparatus, however, it is necessary to previously set the display configuration before the reproduction of the DVD and there is a disadvantage in that the setting cannot be changed during the reproduction of the DVD.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2A is a block diagram showing the structure of the video reproducing apparatus according to the embodiment, FIG. 3 is a schematic diagram showing an example of an operation of the video reproducing apparatus according to the embodiment, FIGS. 4A to 4D are schematic diagrams showing an example of a mask displayed by the video reproducing apparatus according to the embodiment, FIG. 5 is a schematic diagram showing an example of the mask displayed by the video reproducing apparatus according to the embodiment.

DETAILED DESCRIPTION

Various embodiments according to the invention will be described hereinafter with reference to the accompanying drawings. In general, according to one embodiment of the invention, a video reproducing apparatus includes: a reading module configured to read out video information and caption information from a recording medium, the video information including control information for controlling an external apparatus; a video processing module configured to generate a display image to be displayed on a screen based on the video information, the display image having an image corresponding to the control information on a certain position of the screen; a caption processing module configured to generate a subpicture based on the caption information, the subpicture including a caption image for a caption and a mask image for masking the image corresponding to the control information with a given mask pattern when the subpicture is superimposed on the display image; a video synthesizing module configured to generate an overlapped display image by superimposing the subpicture on the display image; and a video signal outputting module configured to output the overlapped display image to a control signal extracting apparatus that extracts a control signal for the external apparatus from the masked image corresponding to the control information in the overlapped display image.

According to another embodiment of the invention, a video reproducing apparatus includes: a reading module configured to read out video information and caption information from a recording medium, the caption information including control information for controlling an external apparatus; a video processing module configured to generate a display image to be displayed on a screen based on the video information; a caption processing module configured to generate a subpicture based on the caption information, the subpicture including a caption image for a caption and an image corresponding to the control information; a video synthesizing module configured to generate an overlapped display image by superimposing the subpicture on the display image; and a video signal outputting module configured to output the overlapped display image to a control signal extracting apparatus that extracts a control signal for the external apparatus from the synthesized display image.

An embodiment of a video reproducing apparatus according to the invention will be described below in detail with reference to the drawings.

Embodiment (Structure of Video Reproducing Apparatus)

Figure 1:
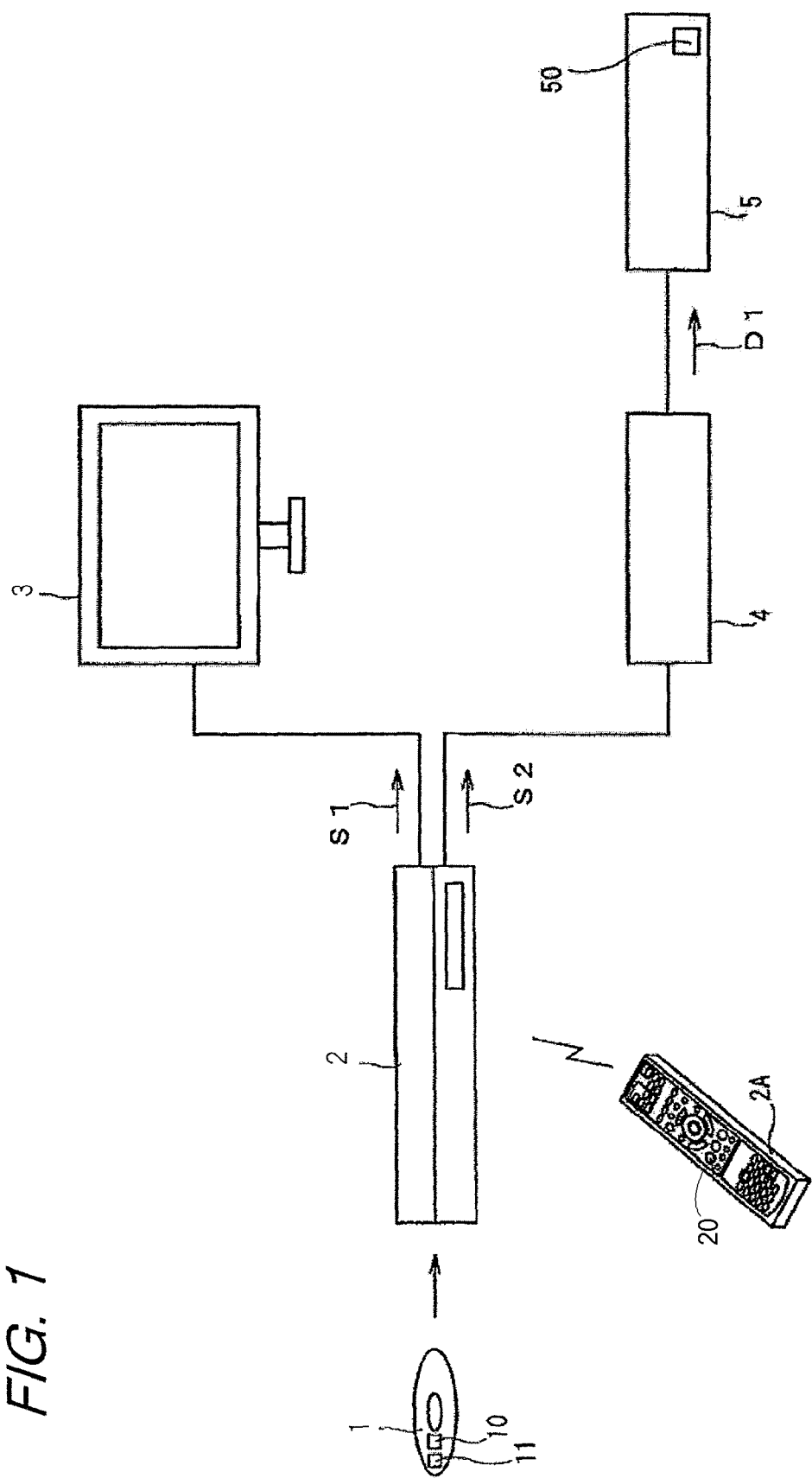
FIG. 1 is a schematic diagram showing structures of a video reproducing apparatus and an external apparatus according to an embodiment.

FIG. 1 is a schematic diagram showing structures of the video reproducing apparatus and an external apparatus according to the embodiment of the invention.

A DVD 1 has video information 10 recorded in a DVD-Video format and caption information 11. The video information 10 includes, in a video, a control signal for controlling an external apparatus 5. The control signal is displayed in two luminance values of 0% and 100%. The caption information 11 can display 32 types of captions at a maximum and they are switched by a caption switching button which will be described below and are thus displayed.

A video reproducing apparatus 2 can reproduce the video information 10 and the caption information 11 which are recorded in the DVD 1. As a result of the reproduction, video signals S1 and S2 are output. Moreover, the video reproducing apparatus 2 has a remote control receiving module for receiving an operating signal transmitted based on an operation of an operating switch through a remote controller 2A constituted by a plurality of operating switches and is operated based on the operating signal. Furthermore, the remote controller 2A has a caption switching button 20 for switching a type of a caption to be reproduced based on the caption information 11 in the video reproducing apparatus 2.

A display apparatus 3 has a display screen such as an LCD (Liquid Crystal Display) and carries out a display processing over the input video signal S1. A control signal extracting apparatus 4 extracts a control signal having the luminance value of 100% from the input video signal S2 and outputs an external apparatus control signal D1 for controlling the external apparatus 5 which will be described below. The external apparatus 5 is operated based on the external apparatus control signal D1 which is input, and is a doll or an illuminating apparatus which has an operating motor, for example. Moreover, the external apparatus 5 has a caption switching button 50 for transmitting a signal corresponding to an operating signal to be output to the video reproducing apparatus 2 when the caption switching button 20 of the remote controller 2A is pressed down.

FIG. 2A is a block diagram showing a structure of the video reproducing apparatus according to the embodiment of the invention.

The video reproducing apparatus 2 includes an information reading module 21 for reading the video information 10 and the caption information 11 from the DVD 1, a video processing module 22 for carrying out a decode processing over the video information 10 and outputting video data which will be described below, a caption processing module 23 for processing the caption information 11 and outputting subpicture data which will be described below, a video synthesizing module 24 for synthesizing the video data output from the video processing module 22 with the subpicture data output from the caption processing module 23 and outputting output video data, a video signal outputting module 25 for converting the output video data transmitted from the video synthesizing module 24 into the video signals S1 and S2 and outputting them, and a REMOTE CONTROL SIGNAL RECEIVING MODULE 26 for transmitting, to the caption processing module 23, a control signal to carry out an operation in order to change the type of the caption when the caption switching button 20 of the remote controller 2A is pressed down.

Figure 2B:
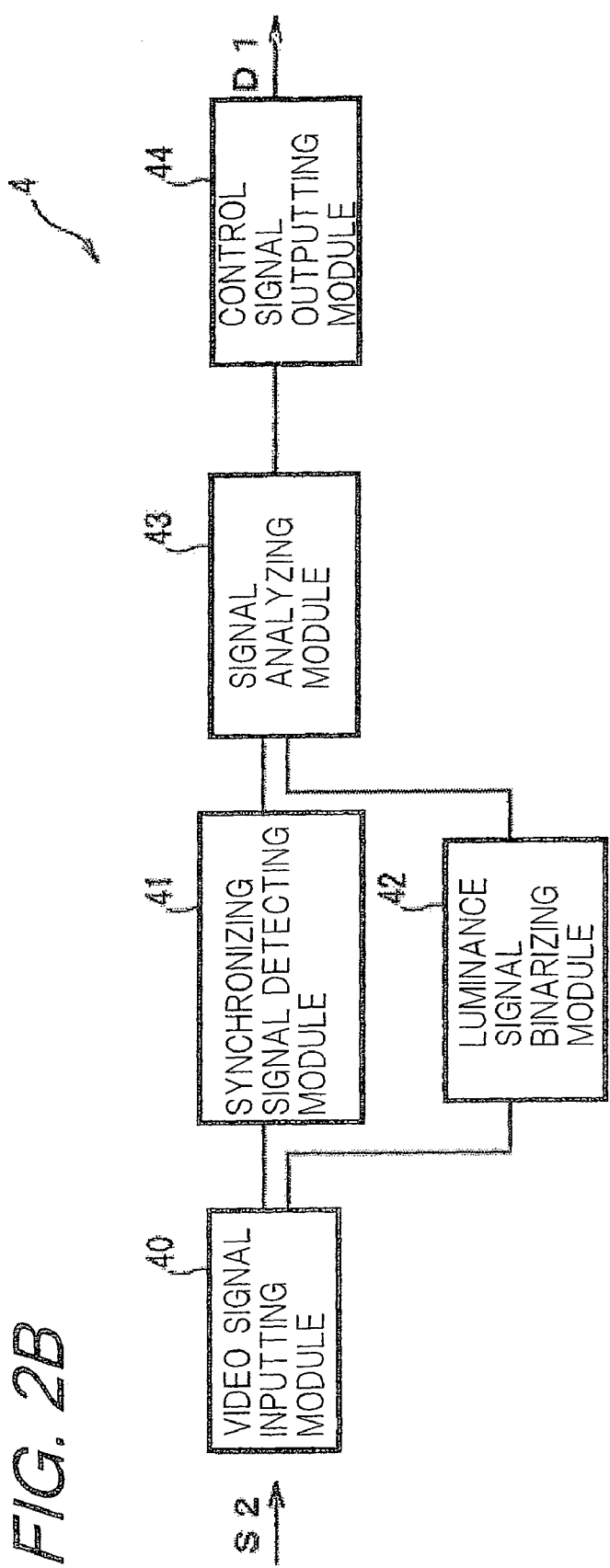
FIG. 2B is a block diagram showing a structure of a control signal extracting apparatus according to the embodiment.

FIG. 2B is a block diagram showing a structure of the control signal extracting apparatus according to the embodiment of the invention.

The control signal extracting apparatus 4 includes a video signal inputting portion 40 for outputting the video signal S2 input from the video reproducing apparatus 2 to a synchronizing signal detecting portion 41 and a luminance signal binarizing portion 42, the synchronizing signal detecting portion 41 for detecting a synchronizing signal from a control signal included in the video signal S2, the luminance signal binarizing portion 42 for binarizing a luminance of the control signal included in the video signal S2, a signal analyzing portion 43 for analyzing a control signal based on the detected synchronizing signal and the binarized control signal, and a control signal outputting portion 44 for outputting a result of the analysis of the signal analyzing portion 43 as the external apparatus control signal D1.

(Operation)

An operation of the video reproducing apparatus according to the embodiment of the invention will be described below with reference to each of the drawings.

When a user of the video reproducing apparatus 2 installs the DVD 1 therein through a DVD inserting port of the video reproducing apparatus 2 which is not shown and executes a reproducing operation by means of the remote controller 2A, the video reproducing apparatus 2 reads the video information 10 and the caption information 11 in the DVD 1 and executes a reproduction processing such as decoding to output the video signals S1 and S2 to the display apparatus 3 and the control signal extracting apparatus 4, respectively.

The display apparatus 3 receives the video signal S1 and carries out a display processing to display a video on the display screen. Moreover, the control signal extracting apparatus 4 receives the video signal S2 and extracts a control signal included in a video, and outputs the external apparatus control signal D1 based on the control signal thus extracted.

The external apparatus 5 receives the external apparatus control signal D1 and is operated based on the external apparatus control signal D1 thus received.

The user presses down the caption switching button 20 of the remote controller 2A or the caption switching button 50, thereby switching a caption to be displayed based on the caption information 11 in the video reproducing apparatus 2.

FIG. 3 is a schematic diagram showing an example of the operation of the video reproducing apparatus according to the embodiment of the invention.

The video processing module 22 carries out the decode processing over the video information 10, thereby outputting video data 220 including control signals c10 to c20 to two lines on a lower end in a video, for example. The control signals c10 to c20 are information which are previously recorded on the video information 10 so as to be displayed in the video data 220 and have a luminance value of 0% or 100%. Each of areas in the two lines is displayed corresponding to an operation of the external apparatus 5, for example.

The caption processing module 23 processes the caption information 11, thereby outputting subpicture data 230 including a mask m1 having the luminance value of 0% to the two lines on the lower end in the video, for example. The subpicture data 230 display a caption 230a together with the mask m1 in the case in which the caption information 11 includes information about the caption 230a.

The video synthesizing module 24 superimposes the subpicture data 230 on the video data 220 and outputs output video data 240. The mask m1 has the luminance value of 0%. Therefore, the control signals c10 to c13 and c17 to c20 displayed in the same positions as the mask m1 are replaced to have the luminance value of 0%. In the output video data 240, only the control signals c14 to c16 are displayed.

FIGS. 4A to 4D are schematic diagrams showing an example of a mask displayed by the video reproducing apparatus according to the embodiment of the invention.

Figure 4A:
Figure 4B:
Figure 4C:
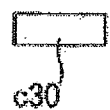

The mask can be variously displayed on the subpicture 230 by combining a mask m2 which displays only a part of the control signals as shown in FIG. 4A, a mask m3 which displays only a part of the control signals with the luminance value of 0% as shown in FIG. 4B, a control signal c30 to be a mask which forcibly displays a part of the control signals with the luminance value of 100% as shown in FIG. 4C, and a display in which the control signals are not processed (or a non-display of the subpicture data 230) as shown in FIG. 4D. In the case in which the mask including the control signal shown in FIG. 4C is displayed on the subpicture 230, the video data 220 does not need to include the control signal.

FIG. 5 is a schematic diagram showing an example of the mask displayed by the video reproducing apparatus according to the embodiment of the invention.

Upon receipt of an operating signal for caption switching from the REMOTE CONTROL SIGNAL RECEIVING MODULE 26, the caption processing module 23 switches and displays 32 types of captions, that is, captions 1 to 32. Masks m10 to m13 which are different from each other are prepared for each of the captions, and the display of the control signal of the video data 220 is changed.

Figure 6:
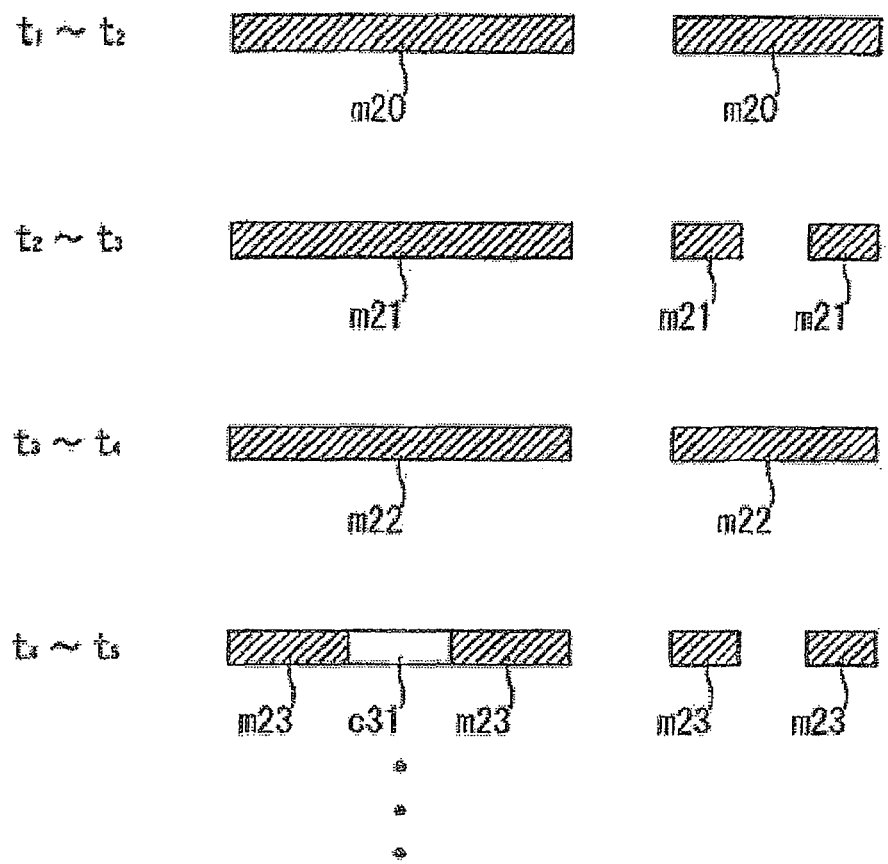
FIG. 6 is a schematic diagram showing an example of the mask displayed by the video reproducing apparatus according to the embodiment.

FIG. 6 is a schematic diagram showing an example of the mask displayed by the video reproducing apparatus according to the embodiment of the invention.

The caption processing module 23 changes and displays the respective types of captions corresponding to a reproducing time, respectively. In the example shown in FIG. 6, a mask m20 is displayed at a reproducing time of t1 to t2, a mask m21 is displayed at a reproducing time of t2 to t3, a mask m22 is displayed at a reproducing time of t3 to t4, and a mask m23 and a control signal c31 are displayed at a reproducing time of t4 to t5.

Advantage of the Embodiment

According to the embodiment, by executing the caption switching operation during the reproduction of the DVD 1, it is possible to change the control signal in the video data in response to the mask in the subpicture data or the control signal. Consequently, it is possible to change the usual operation of the external apparatus 5 in a single pattern based on the control signal in the video data into another pattern by switching the caption.

The mask in the subpicture data or the control signal may be changed with the reproducing time as shown in FIG. 6 or a certain mask or control signal may be displayed without a change.

Moreover, it is also possible to employ a structure in which the control signal is not included in the video data 220 but the subpicture data 230 and to display the control information in a plurality of patterns by switching the caption.

What is claimed is:

1. An apparatus control system comprising:
a video reproducing apparatus comprising:
an information reading module configured to read out, from a digital versatile disc (DVD), video information including control information in a display data region and caption information including a given pattern of mask in a region overlapping the control information of the video information in the display data region;
a video processing module configured to generate and process a first display data including the control information based on the video information;
a caption processing module configured to generate and process a second display data including the mask based on the caption information;
a caption switching module configured to switch displaying of the mask by controlling the caption processing module;
a video synthesizing module configured to generate an output display data by synthesizing the first display data including the control information and the second display data including the mask; and
a video signal outputting module configured to output the output display data;
a control signal extracting apparatus configured to, based on the control information being masked by the mask contained in the output display data, detect a synthesizing signal and to output an external apparatus control signal being extracted by binarizing a luminance of the control information; and
an external apparatus configured to operate based on the external apparatus control signal outputted from the control signal extracting apparatus.

2. The apparatus control system of claim 1,
wherein the information reading module reads out a mask containing a control information from the caption information.

3. The apparatus control system of claim 1,
wherein the information reading module reads out a plurality of patterns of the masks from the caption information.

4. The apparatus control system of claim 3,
wherein the caption switching module controls the caption processing module to select a given pattern of mask from the plurality of patterns of the masks, or not to display the mask.

5. An apparatus control system comprising:
a video reproducing apparatus comprising:
an information reading module configured to read out, from a DVD, video information and caption information including control information in a display data region;
a video processing module configured to generate and process a first display data based on the video information;
a caption processing module configured to generate and process a second display data including the control information based on the caption information;
a caption switching module configured to switch displaying of the control information by controlling the caption processing module;
a video synthesizing module configured to generate an output display data by synthesizing the first display data and the second display data including the control information; and
a video signal outputting module configured to output the output display data;
a control signal extracting apparatus configured to, based on the control information contained in the output display data, detect a synthesizing signal and to output an external apparatus control signal being extracted by binarizing a luminance of the control information; and
an external apparatus configured to operate based on the external apparatus control signal outputted from the control signal extracting apparatus.

6. The apparatus control system of claim 5,
wherein the information reading module reads out a plurality of patterns of the control information from the caption information.

7. The apparatus control system of claim 6,
wherein the caption switching module controls the caption processing module to select a given pattern of control information from the plurality of patterns of the control information, or not to display the control information.

* * * * *